Patented Oct. 5, 1948

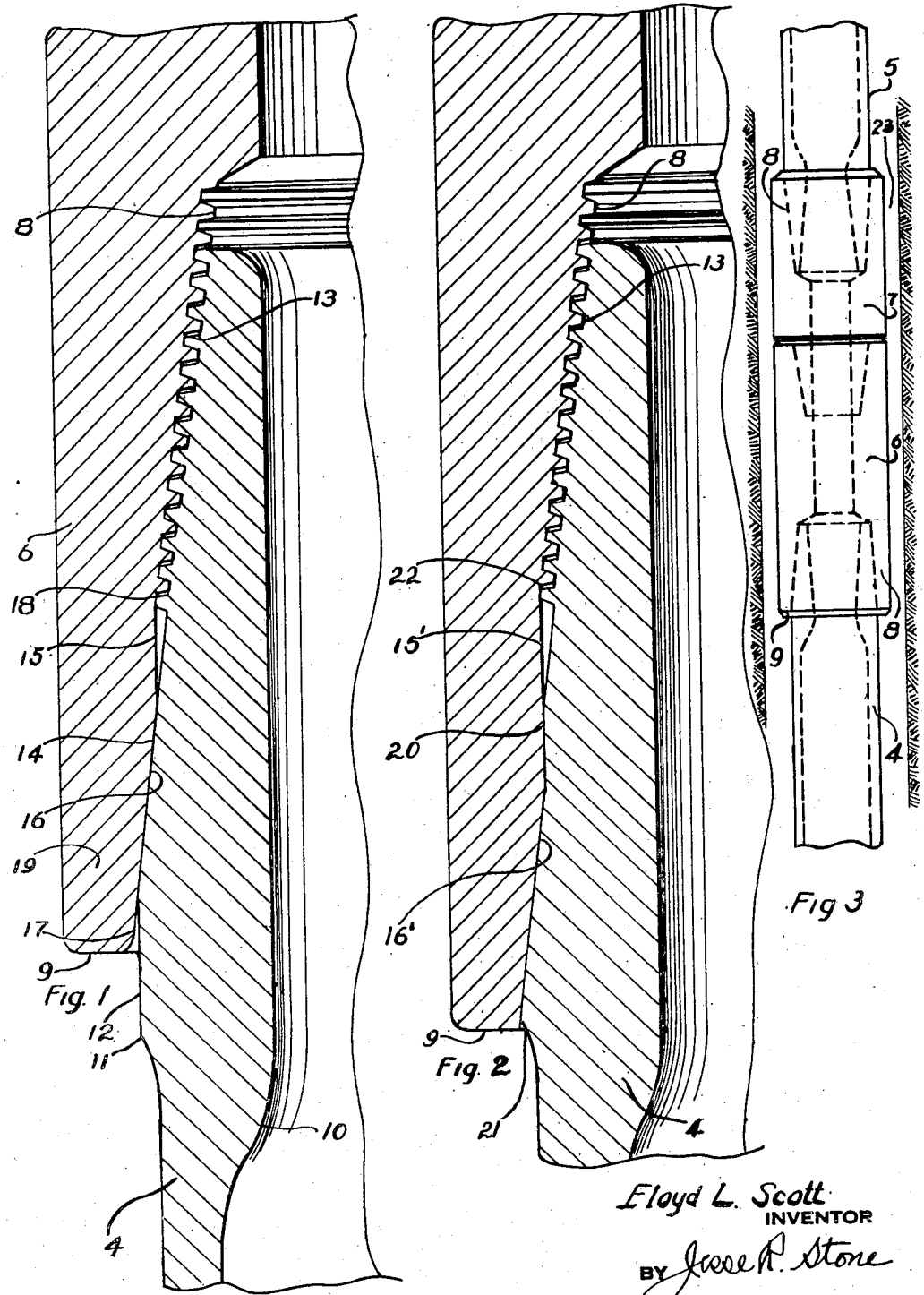

2,450,452

UNITED STATES PATENT OFFICE 2,450,452

SEAL GRIP TOOL JOINT

Floyd L. Scott, Houston, Tex., assignor to Hughes Tool Company, Houston, Tex., a corporation of Delaware Application July 29, 1944, Serial No. 547,187

9 Claims. (Cl. 285—146)

1

The invention relates to tool joints to be used upon a drill stem in rotary well drilling. Such joints are for the purpose of securing the drill stem sections detachably together.

Before the sections of pipe making up the drill stem are introduced into the well they are customarily equipped, at the lower end, with the pin member of the joint, and the upper end of each pipe section has thereon the box member of the tool joint. The sections are coupled together by screwing the pin member of one section into the box on the upper end of the next lower section.

The joint members are screwed upon the ends of the pipe sections and it is this connection of tool joint socket and pipe end which causes the most difficulty.

Probably no other type of pipe has to undergo as severe usage or has to withstand such enormous strains and stresses in use as does a rotary drill stem. In deep wells the drill stem may be two miles long or more. Wells of a mile or more in depth are common. In use, the drill stem and drill are rotated rapidly in the hole and vibration longitudinally is developed by the action of the bit upon the well bottom. The weight of the superposed drill stem exerts longitudinal compression strains on the lower drill stem sections in drilling, and the weight or tension strain upon the upper sections as the drill is lifted, place upon the joints longitudinal strains of many tons. The rapid rotation of the stem places a heavy torque upon the joints and also whips the drill stem in the hole so that lateral twisting strains develop which tend to cause fatigue and progressive fracture of the metal. The pump pressure employed in forcing the abrasive drilling mud through the drill stem may be as high as 1000 pounds to the square inch or even higher, particularly where the well is deep. This places a bursting strain upon the pipe and also leads to rapid cutting whenever a leak develops in the joint. It is extremely difficult to keep the hole straight, and as a result, most wells are more or less crooked. Due to crooked holes, a lateral bending strain is experienced which will quickly impair a joint not properly connected. It will thus be readily apparent that a drill stem must have tool joints so secured to the pipe sections as to withstand destructive usage.

There must be a fluid tight seal, as leakage at the connection will cause rapid cutting and destruction of the joint. There must also be means to prevent the breaking of the pipe at the last engaged thread where the threaded connection is made between the pipe and the joint.

2

The object of the present invention involves the forming of the threads upon the pipe end and joint socket so that the last engaged thread, where failure is most likely to occur, will be protected from lateral bending strains. I aim to support the joint by close contact between the pipe and joint at a point comparatively far removed from said thread. By this provision I remove the area of high stress concentration due to bending strains as far as possible from the last engaged thread so that there will be no breakage of the pipe at that point during use.

I desire to extend the sealing and supporting area materially beyond the threaded area and to do so without making the wall of the joint socket thinner than necessary, for it is a circumstance to be considered that the outer and inner diameters of the drill stem at the joints are limited. The trade tends to standardize the measurement of the pipe and joint. Changes in the normal wall thickness of both members must be avoided as far as possible. The hole through the joint must be as large as possible to allow free flow of fluid and to allow passage for tools in deep well operations. On the other hand, the outer diameter must be as small as possible to allow the upflow of the flushing fluid around the drill string, and also to accommodate such tools as overshots and pipe cutters. It is also to be noted that the wall of the tool joint must be thick enough to allow for considerable external wear due to rotation of the drill stem and consequent abrasion of the outer surface against the wall of the well. I contemplate providing the joint with a normal wall thickness and still extend the joint a greater than normal distance beyond the last engaged thread upon the pipe.

The invention may be better illustrated by reference to the drawings herewith, wherein:

Fig. 1 is a broken longitudinal section through a portion of a pipe joint showing the connection between the tool joint socket and the end of the pipe section constructed in accordance with this invention.

Fig. 2 is a similar view illustrating a slightly different embodiment of the invention.

Fig. 3 is an assembly view illustrating the manner in which a tool joint is employed to connect the pipe ends of a drill stem.

Referring to Fig. 3, it will be noted that the drill stem sections 4 and 5 are connected by means of the tool joint member. The upper end of the section 4 is connected at 8 to the tool joint box member 6. The connection at 8 is ordinarily a threaded connection and the present invention involves an improvement upon the ordinary form of this connection. The lower end of the pipe section 5 is connected to the pin member 7 of the tool joint by a similar threaded connection at 8.

As previously noted, the outer diameter of the drill stem members is limited by the fact that space must be provided as indicated at 23 between the tool joint and the wall of the hole for the circulation of flushing fluid and for the passage of tools, such as overshots or pipe cutters. These connections are fairly well standardized in the trade. For example, in ordinary drilling, 4½" outer diameter pipe is frequently employed. This drill pipe is connected by means of tool joints which normally range between 5¾" and 6" outer diameter. About 65% of the tool joints designed for 4½" pipe are 5¾" in outer diameter. Thus in an 8" hole there is provided between the tool joint and the wall of the well a space at 23 of 1⅛" allowing for the passage of fluid or of an overshot fishing tool. It will be seen that reducing the width of this space is to be avoided as far as possible.

In the rotating of the drill stem in the well the abrasion of the wall of the well against the outer surface of the tool joints results in a gradual reduction in thickness of the wall of the joint. The period when the tool joint becomes so worn that it can no longer be used is dependent upon the wall thickness at the lower end 9 of the tool joint where the elevator is engaged when it is used in raising and lowering the drill stem in the well. When this shoulder becomes so thin that the elevator will no longer hold the pipe, then the joint will have to be discarded. It is desirable therefore to make this shoulder as wide as possible so that the life of the joint may be prolonged.

In the tool joint connection illustrated in Fig. 1 the pipe member 4 is shown as having an internal upset at 10 and an external upset at 11. The outer surface of the pipe has a short cylindrical area 12 and beyond this the outer surface is tapered to the end of the pipe section. At the end of the pipe section the pipe has thereon a threaded area 13 extending for a portion of the tapered surface, which may be approximately half of the tapered area. Beyond the threaded portion, the pipe is tapered on a line with the troughs of the threads on the pipe, thus providing a sealing surface 14 against which the tool joint may engage.

The tool joint member 6 along the interior tapered sock 8 is threaded to engage with the threaded end of the pipe. This threaded portion extends outwardly from the smaller end of the socket about half way to the end of the joint, and beyond the threaded area is a cylindrical surface 15, which allows for the insertion of the threaded portion of the pipe end. Beyond the cylindrical area 15 is a tapered area 16, which contacts with the smooth area 14 upon the pipe end. I prefer to have the end of the joint socket extend beyond the cylindrical outer surface 12 of the pipe to provide a slight clearance at 17 between the joint socket and the pipe to prevent pinching or marring of the outer surface of the pipe by the engagement of the end of the tool joint with the pipe during lateral bending of the drill stem in use.

It will be noted that by forming the tapered sealing and supporting area 14, 16, on the joint, I am able to extend the supporting engagement between the joint socket and the pipe to a material distance beyond the last engaged thread 18. It is also to be noted that this is done without materially reducing the wall thickness of the open end 19 of the joint socket. For, by making the tapered area 14 as an extension of the troughs of the threads on the pipe end I obtain a greater thickness of the wall of the joint socket at the end thereof than would be the case if the sealing area at the smooth tapered portion were an extension of the troughs of the threads on the box. The wall thickness on the joint socket is maintained, in spite of its unusual length, by forming the smooth tapered area on the pipe inwardly toward the axis of the joint, as compared with the line of taper of the crests of the pipe threads. This must be done, however, having regard to strength in the wall of the pipe. I thus provide a sealing and supporting surface which will prevent the passage of liquid at this point, but as this area extends to a point some distance from the last engaged thread the vibration or lateral strain which tends to crack the metal at the thread will be reduced at the threaded portion. By maintaining the present thickness of the end of the joint socket I do not reduce the length of the period when wear on the outer surface of the joint has made it necessary to discard it.

In Fig. 2, I have shown the sealing area between the joint socket and the pipe end at 16'. This tapered supporting and sealing area in this embodiment is formed by extending the cylindrical portion 15' of the joint further outwardly toward the end of the joint member and this has been done by forming a contacting cylindrical portion 20 upon the pipe end for a short distance to permit the lengthening of the cylindrical area on the joint socket. Beyond the cylindrical portion 20 upon the pipe end the joint is tapered at 16' at any desired angle, it being contemplated, however, that the tapered area will terminate at the point where the wall of the pipe is at its greatest thickness. I prefer to allow a slight clearance, as at 21, to prevent the pinching of the pipe by the joint member in use, as previously explained.

As has been previously noted, by constructing the taper upon the smooth portion of the joint end so that it will lie inwardly toward the axis of the joint as compared to the ordinary taper which forms an extension of the taper of the troughs of the threads on the joint member, the wall of the joint member may be maintained in thickness and thus the life of the joint may be preserved. In this modification another embodiment, whereby this inventive idea may be carried out, is illustrated.

In connecting the pipe end within the joint socket it is preferred to heat the joint socket so that it may be expanded slightly, allowing it to be screwed upon the pipe end by hand. The joint socket is then allowed to cool and shrink upon the pipe end, thus bringing the sealing and supporting areas into tight engagement without galling or marring the contacting surfaces. It may be noted that a slight clearance 22 is shown between the flanks of the threads of the socket and the pipe end, which allows for longitudinal expansion of the joint socket while heated, thus avoiding interference.

By forming the tapered sealing and supporting areas upon the pipe at a point spaced a material distance away from the last engaged thread, the lateral bending strains exerted upon the joint will be entirely removed from the area of the last engaged thread. By forming this taper upon the pipe end at a point inwardly from the crests of the threads upon the pipe I am enabled to preserve the thickness of the wall of the joint socket and thus the life of the joint will not be reduced.

This type of joint will thus provide a sealing area between the pipe and the joint which will be free from danger of leakage and, at the same time, the point of support between the joint socket and the pipe will be far removed from the last engaged thread where breakage must be avoided. Furthermore, by forming this sealing area inwardly toward the axis of the pipe and away from the line of the crests of the pipe threads, when extended, I am enabled to maintain the desired thickness upon the wall of the joint socket and thus avoid reducing the life of the joint.

What I claim as new is:

1. In a drill stem connection, a tapered pipe end having a threaded portion to engage a tool joint socket, the threaded portion extending over approximately one half the length of the tapered portion, the remainder being smooth and unthreaded, and having a taper which inclines inwardly toward the joint axis and in substantial alignment with the taper of the roots of the thread on the pipe end, a joint socket threaded to engage said pipe end and having a smooth unthreaded area extending a material distance beyond the threaded portion to contact and form a seal with said smooth area upon said pipe, there being a substantially cylindrical surface in said socket between the root of the outermost thread of the threaded portion and the remainder of the unthreaded area.

2. In a tapered, threaded connection between a tool joint socket and a pipe end, the improvement comprising extending the length of said socket upon the joint a material distance beyond the tapered threaded portion and forming a smoothly tapered, sealing and supporting area between the extended end of said socket and said pipe end, said tapered area positioned inwardly toward the joint axis from the troughs of the tapered threads on said joint and whereby the wall of said joint socket may remain comparatively thick to provide a maximum of material for diameter in the end of the socket.

3. In a pipe connection for drill stems, a pipe end tapered to engage a tool joint and threaded for approximately half the length of the taper, the remainder of the tapered end being unthreaded and tapered as an extension of the troughs of the thread on the pipe, a tool joint having a tapered socket threaded to engage said pipe end and having a smooth sealing area to contact with the unthreaded portion of said pipe end, the sealing area being tapered as an extension of the crests of the threads on the socket so that the wall of said socket at the end thereof provides the maximum thickness of material relative to diameter, said socket being adapted to be heated and then screwed upon said pipe end and shrunk in position.

4. A tool joint having a tapered socket, tapered threads therein at the smaller end, a smooth unthreaded area extending over approximately one-half said socket at its open end beyond said threads, said unthreaded area being formed inwardly toward the joint axis from the tapered surface defined by the crests of the threads on the socket, thereby maintaining the maximum thickness of the wall of said socket at the end thereof.

5. A tool joint having a tapered socket, threads therein at its smaller end to engage a pipe end, a smooth unthreaded area extending over approximately one-half said socket at its open end, said unthreaded area being formed inwardly toward the joint axis from the tapered surface defined by the troughs of the threads on the socket, thereby maintaining the thickness of the wall of said socket at the end thereof, a tapered threaded pipe end to fit said socket, the said socket being of sufficient length to extend slightly beyond the tapered surface of the pipe so that a slight clearance between the joint and the pipe at that point is provided in the manner described.

6. In a sealing and gripping tool joint and pipe connection comprising a tapered tool joint socket, a tapered thread therein, a tapered sealing area at the outer end of said socket, said sealing area constituting a taper which is substantially a continuation of the taper of the crests of the threads of said socket so as to provide a maximum thickness of material at the end of the socket.

7. In a sealing and gripping tool joint and pipe connection comprising a tapered pipe end, a tapered threaded end thereon, a tapered sealing area extending from said thread to the periphery of the pipe, said sealing area constituting a taper which is substantially a continuation of the taper of the roots of the threads of the pipe end so as to provide for a minimum of material to fit into the socket.

8. In a sealing and gripping tool joint and pipe connection comprising a tapered tool joint socket, a tapered thread therein, a tapered sealing area at the outer end of said socket, said sealing area constituting a taper which is substantially a continuation of the taper of the crests of the threads of said socket so as to provide a maximum thickness of material at the end of the socket, a tapered pipe end, a tapered threaded end thereon, a tapered sealing area extending from said thread to the periphery of the pipe, said sealing area constituting a taper which is substantially a continuation of the taper of the roots of the threads of the pipe end so as to provide for a minimum of material to fit into the socket.

9. A threaded pipe and tool joint connection comprising a tapered and threaded pipe end and tool joint socket, said pipe and said socket having complementary smooth tapered sealing areas adjacent said threaded areas, said sealing areas being on a taper stepped inwardly from the taper of the threaded areas so as to provide a maximum of material in the socket end to reinforce the threaded area, there being a substantially cylindrical surface extending from the root of the socket threads to the tapered sealing area outwardly therefrom.

FLOYD L. SCOTT.

REFERENCES CITED

The following references are of record in the file of this patent:

UNITED STATES PATENTS

| Number | Name | Date |
|---|---|---|
| 1,817,808 | Eaton | Aug. 4, 1931 |
| 1,926,925 | Westcott | Sept. 12, 1933 |
| 1,849,066 | Bridges | Mar. 15, 1932 |
| 2,054,118 | Childs, et al. | Sept. 15, 1936 |
| 2,330,686 | Cornell | Sept. 28, 1943 |
| 2,234,957 | Boynton | Mar. 18, 1941 |